(12) United States Patent
Wang et al.

(10) Patent No.: US 7,808,656 B2
(45) Date of Patent: Oct. 5, 2010

(54) PROBE SENSOR WITH MULTI-DIMENSIONAL OPTICAL GRATING

(75) Inventors: Zhong L. Wang, Marietta, GA (US);
William L. Hughes, Atlanta, GA (US);
Brent Burchine, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 12/730,603

(22) Filed: Mar. 24, 2010

(65) Prior Publication Data

US 2010/0180355 A1   Jul. 15, 2010

Related U.S. Application Data

(62) Division of application No. 11/369,574, filed on Mar. 7, 2006, now Pat. No. 7,705,999.

(51) Int. Cl.
*G01B 11/14* (2006.01)

(52) U.S. Cl. .................................. 356/614; 356/622

(58) Field of Classification Search ......... 356/614–622, 356/501, 496, 498–499, 508; 250/559.29, 250/231.13–231.18, 237 R, 237 G, 232–236; 33/706–707
See application file for complete search history.

(56) References Cited

U.S. PATENT DOCUMENTS

| 5,394,741 A * | 3/1995 | Kajimura et al. ............... 73/105 |
| 5,610,715 A * | 3/1997 | Yoshii et al. ................. 356/499 |
| 2007/0103697 A1* | 5/2007 | Degertekin .................. 356/501 |

* cited by examiner

*Primary Examiner*—Gregory J Toatley, Jr.
*Assistant Examiner*—Tri T Ton
(74) *Attorney, Agent, or Firm*—Bryan W. Bockhop; Bockhop & Associates, LLC

(57) ABSTRACT

A displacement sensor employs an electromagnetic radiation source that generates a beam of electromagnetic radiation for measuring a feature of an object. The displacement sensor includes a displacement probe, a multi-dimensional diffraction grating and a plurality of photon detectors. A reflection surface, which is changed when the probe interacts with the object, interacts with the beam from the electromagnetic radiation source and reflects a beam from the reflection surface. The multi-dimensional diffraction grating interacts with the reflected beam and generates a pattern of diffracted beams. Each photon detector senses a different diffracted beam, thereby providing information about the state of the probe.

10 Claims, 3 Drawing Sheets

PROBE SENSOR WITH MULTI-DIMENSIONAL OPTICAL GRATING

CROSS-REFERENCE TO RELATED APPLICATION(S)

This application is a divisional of, and claims the benefit of, U.S. patent application Ser. No. 11/369,574, filed Mar. 7, 2006, the entirety of which is hereby incorporated herein by reference.

BACKGROUND OF THE INVENTION

1. Field of the Invention

The present invention relates to displacement sensors and, more specifically, to a displacement sensor that uses a beam of electromagnetic radiation to measure displacement of a probe.

2. Description of the Prior Art

Atomic Force Microscopes (AFM) are used to measure surface characteristics of materials at the nano scale. AFM's are useful in measuring thin and thick film coatings, ceramics, composites, glasses, synthetic and biological membranes, metals, polymers, and semiconductors, among many other things. By using an AFM one can not only image the surface with near atomic resolution but can also measure the forces of the surface of a sample at the nano-Newton scale.

An AFM typically includes a probe with a probe tip extending therefrom. One type of probe is a cantilever; another is a force sensing integrated readout and active tip (FIRAT) probe. A cantilever includes a beam with a probe tip at a distal end. The beam may be angularly deflected to move the probe tip toward the object being measured. When the probe tip begins to interact with the object, the deflection of the beam can be measured by sensing light from a laser reflected off of the beam. A FIRAT probe includes a membrane that is supported by a frame. A FIRAT probe tip is typically affixed to the center of the membrane. The membrane may be displaced vertically by one of several methods. In one such method, the membrane has a first conductive surface that is spaced apart from a second conductive surface. When a similar charge is applied to both the first conductive surface and the second conductive surface, the two surfaces repel each other, thereby forcing the membrane (and the probe tip) away from the second conductive surface. The vertical displacement of the probe tip is controlled in this way. The vertical displacement of the membrane is detected by reflecting light from a laser off of the membrane and passing the reflected light through a diffraction grating and then measuring the intensity of one or more modes of the diffracted light using a photodetector.

A diffraction grating is a reflecting or transparent substrate whose surface contains fine parallel grooves or rulings that are equally spaced. When light is incident on a diffraction grating, diffractive and mutual interference effects occur, and light is reflected or transmitted in discrete directions, called orders. A diffraction grating includes a transparent surface with a plurality of parallel lines scored in the surface or printed on the surface and spaced apart at a distance so that they cause a beam of light at a predetermined wavelength to diffract. A one-dimensional diffraction grating includes one set of parallel lines, whereas a two-dimensional diffraction grating includes two sets of parallel lines transverse to each other. Certain natural substances and synthetic substances are diffraction gratings due to their ordering of unit cells in their molecular structures. For example, certain minerals act as diffraction gratings. Thus, certain crystals are diffraction gratings and, if they have greater than a nominal thickness, they are three-dimensional (or even multi-dimensional) diffraction gratings. A diffraction grating with more than one dimension will generate more than one diffracted beam, in which each beam can correspond to a different order. Also, a diffracted beam includes a "bright field" central portion and a "dark field" fringe portion. The central portion can provide information about one aspect of the surface from which the diffracted beam originates, whereas the fringe portion can provide information about another aspect of the surface.

Beam-deflection is the most common detection method used in modern commercial probe microscopes because of its simplicity and versatility. Typically, beam deflection requires a force-sensing structure, a probe tip, a light source, and a photon detector. The force sensing structure can be a cantilever, a membrane, or any other substrate that measures displacement or force. Displacement of the force-sensing structure is translated into angular displacement by reflecting light from the backside of the force-sensing structure onto a photon detector. Such displacement can be related to the force imparted onto the sample or to the probe tip.

One modification to the beam-deflection method is to insert a one-dimensional diffraction grating into the path of the beam and measure angular displacement of diffraction spots rather than angular displacement of the reflected incident beam. Recent advancements in probe microscopy have combined a micro-machined membrane, transparent substrate, electrostatic actuator and a diffraction grating for optical interferometric detection. Currently a one-dimensional diffraction grating is used in conjunction with a membrane for such applications. During operation, only one diffraction spot is detected and related to the displacement or force of the membrane tip. An inherent assumption in the current design is that the membrane deforms uniformly in the radial direction when actuated or placed under load. Therefore the membrane measures only vertical displacements or forces.

Existing systems can provide information about the vertical topography of a surface and the vertical component of surface forces exerted by the object on the probe tip. However, many surfaces also impart lateral and even twisting forces on the probe tip. This may result in non-vertical displacement and deformation of the surface (i.e., the membrane or the cantilever) to which the probe tip is attached. Information about these lateral and twisting forces can provide valuable insight into the nature of a sampled surface. No existing system provides information about the degree or type of non-vertical displacement or deformation of the membrane or cantilever while it interacts with a surface.

Therefore, there is a need for a force microscopy system that provides information about non-vertical displacement and forces imparted on a probe tip by a sampled surface.

There is also a need for a microscopy system that provides information through both bright field analysis and dark field analysis of a diffracted beam.

SUMMARY OF THE INVENTION

The disadvantages of the prior art are overcome by the present invention which, in one aspect, is a displacement sensor that employs an electromagnetic radiation source that generates a beam of electromagnetic radiation for measuring a feature of an object. The displacement sensor includes a displacement probe, a multi-dimensional diffraction grating and a plurality of photon detectors. The displacement probe has a first surface from which a probe depends outwardly. An oppositely-disposed reflection surface is changed when the probe interacts with the object. The reflection surface is disposed so as to interact with the beam from the electromagnetic radiation source and so that a reflected beam reflects from the reflection surface. A characteristic of the reflected beam is indicative of a state of the probe. The multi-dimensional diffraction grating is disposed so as to interact with the reflected beam and generate a pattern of diffracted beams. Each of the plurality of photon detectors is disposed so as to sense a different one of the diffracted beams, thereby providing information about the state of the probe.

In another aspect, the invention is a displacement sensor that includes a displacement probe, a two-dimensional diffraction grating, a light source, a first annular photon detector and a second annular photon detector. The displacement probe has a first surface, a probe depending outwardly therefrom, and an oppositely-disposed reflection surface that is changed when the probe interacts with the object. The reflection surface is disposed so as to interact with the beam from the light source and so that a reflected beam reflects from the reflection surface. A characteristic of the reflected beam is indicative of a state of the probe. The two-dimensional diffraction grating is disposed between the light source and the reflection surface so that at least one diffracted beam is created by the diffraction grating. The light source generates a beam of light that is directed to the reflection surface. The first annular photon detector is disposed between the light source and the diffraction grating and defines a first hole passing therethrough. The first hole has a diameter corresponding to a diameter of a light beam directed to the reflection surface. The first annular photon detector includes a plurality of spaced-apart first photosensitive segments, each of which is responsive to a quality of the reflected beam. The second annular photon detector is disposed between the first annular photon detector and the diffraction grating. The second annular photon detector defines a second hole passing therethrough. The second hole has a diameter sufficient to allow the reflected beam to pass therethrough. The second annular photon detector includes a plurality of spaced-apart second photosensitive segments, each of which is responsive to a quality of the diffracted beam.

In another aspect, the invention is a displacement sensor, employing an electromagnetic radiation source that generates a beam of electromagnetic radiation, for measuring a feature of an object. The displacement sensor includes a displacement probe, a multi-dimensional diffraction grating, a first photon detector and a second photon detector. The displacement probe has a first surface with a probe depending outwardly therefrom. An oppositely-disposed reflection surface is changed when the probe interacts with the object. The reflection surface is disposed so as to interact with the beam from the electromagnetic radiation source and so that a reflected beam reflects from the reflection surface. A characteristic of the reflected beam is indicative of a state of the probe. The multi-dimensional diffraction grating is disposed so as to interact with the reflected beam and generate at least one diffracted beam. The first photon detector is spaced apart from the diffraction grating and is disposed so as to sense a central portion of the diffracted beam. The second photon detector is spaced apart from the diffraction grating and is spaced apart from the first photon detector. The second photon detector is disposed so as to sense a fringe portion of the diffracted beam.

In yet another aspect, the invention is a method of measuring displacement of a probe having a reflective surface and a light source that generates a beam of light directed to the reflective surface in which a reflected beam is reflected from the reflective surface. In the method, the reflected beam is diffracted with a multi-dimensional diffraction grating. A quality of at least one diffracted beam propagated from the diffraction grating, indicative of a state of the probe, is measured.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figures 1A, 1B:
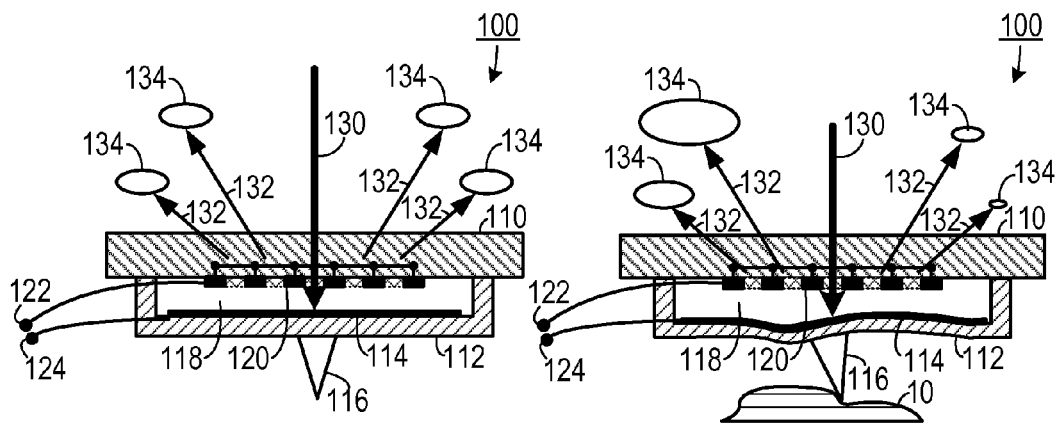
FIG. 1A is a cross sectional view of one illustrative FIRAT embodiment of the invention.
FIG. 1B is a cross sectional view showing the embodiment shown in FIG. 1A in which the probe is laterally deflected by a sample.

A preferred embodiment of the invention is now described in detail. Referring to the drawings, like numbers indicate like parts throughout the views. Unless otherwise the figures are not drawn to scale and objects may be shown out of proportion to other objects for the sake of clarity. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A and 1B, one illustrative embodiment of the invention is a FIRAT-type displacement sensor that includes a substrate 110 and a spaced-apart displacement structure, such as membrane 112, forming a cavity 118 there between. A two-dimensional diffraction grating 120 is disposed on the cavity-side of the substrate 110 and a reflective electrode 114 is disposed on the cavity-side of the membrane 112. The membrane 112 may be biased by applying a charge to the diffraction grating 120 and the electrode 114 through contacts 122 and 124, respectively. A probe tip 116 extends downwardly from the membrane 112.

A light beam 130 is directed toward the reflective electrode 114 and reflects therefrom. When the reflected beam (not shown expressly in this figure) passes through the diffraction grating 120 a plurality of diffracted beams 132 are generated. The diffracted beams 132 can be detected by suitably-placed photon detectors 134.

As shown in FIG. 1B, when the membrane 112 is biased toward a surface 10 of an object, the probe tip 116 may interact with the surface 10 and cause the membrane 112 to deform. This deformation causes the diffracted beams 132 to change in at least one measure of quality with respect to each other. For example, the intensity of the diffracted beams 132 can change relative to each other. Other quality measures could include angular displacement and phase angle. The relative change in quality is represented by the relative sizes of the photon detectors 134 shown in FIG. 1B.

Figure 2:
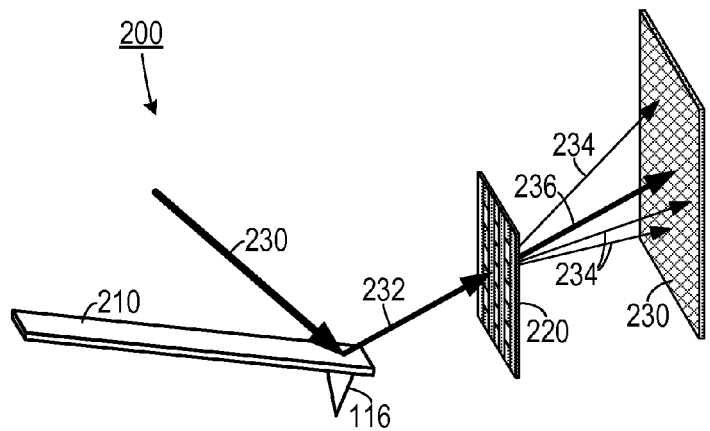
FIG. 2 is a perspective view of a cantilever embodiment of the invention.

A cantilever-type displacement sensor 200 embodiment of the invention is shown in FIG. 2. This displacement sensor 200 includes a cantilever beam 210 with a probe tip 116 depending downwardly therefrom. An incident light beam 230 is reflected off of a surface of the cantilever beam 210, forming a reflected light beam 232. A two-dimensional diffraction grating 220 is placed ion the path of the reflected light beam 232, thereby forming a plurality of diffraction beams 234, along with a remnant 236 of the reflected beam 232. The diffraction beams 234 and the remnant beam 236 are sensed with a photon sensor 230.

Figure 3:
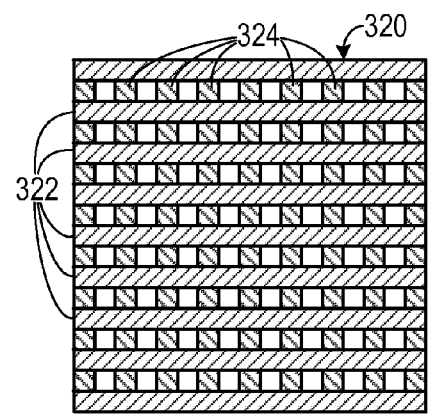
FIG. 3 is a plan view of a two-dimensional diffraction grating.

A two-dimensional diffraction grating 320, shown in FIG. 3, includes a first set of parallel lines 322 and a second set of parallel lines 324 that is transverse to the first set of parallel lines 322. (It should be noted that the lines are not drawn to scale, nor are they necessarily drawn proportionally in width to the width of the spaces between them.) While the sets of lines are shown at right angles to each other, other angles could be used in specific applications.

Figure 4A:
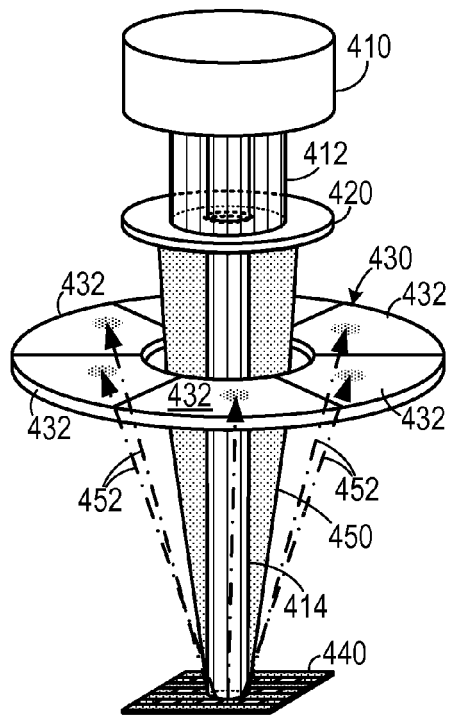
FIG. 4A is a top perspective view of one illustrative embodiment of the invention.

One probe sensor (that could be used, for example, with a FIRAT-type probe), shown in FIG. 4A, includes a light source 410 that generates a light beam 412 of a predetermined wavelength and a diffraction grating 440, which generates a pattern of diffracted beams 452. The diffraction grating 440 may be placed against the substrate of the probe (which is not shown in this figure, but is shown in FIGS. 1A and 1B). A reflected beam photon detector 420 (shown in detail in FIG. 4C) includes a first annular disk 421 and a plurality of spaced-apart photon detector segments 422. The annular disk 420 defines a centrally-disposed hole 424 passing therethrough. The centrally-disposed hole 424 has a diameter that allows a portion 414 of the light beam 412 to pass therethrough. The configuration shown can measure the displacement and the spatial intensity distribution of the reflected beam 450. Other qualities of the beams (e.g., position and phase) may be measured with different configurations and through the use of signal processing methods.

A diffracted beam photon detector 430 (shown in detail in FIG. 4D) is placed between the reflected beam photon detector 420 and the diffraction grating 440. The diffracted beam photon detector 430 includes an annular disk 431 that defines a central hole 434, through which the reflected beam 450 passes, and includes a plurality of diffracted beam photon detector segments 432.

Figure 4B:
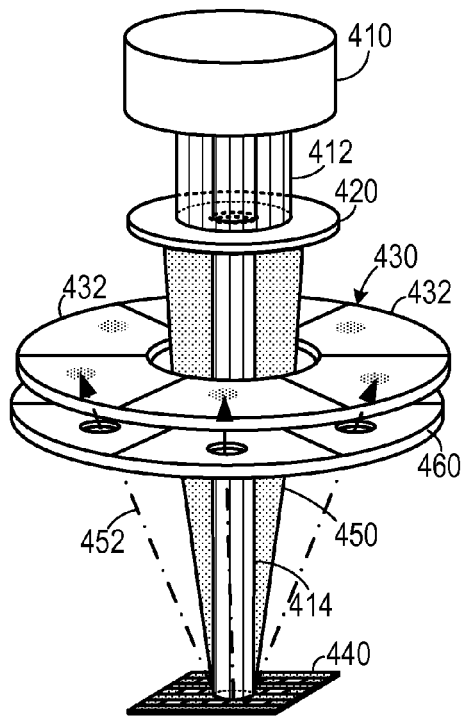
FIG. 4B is a top perspective view of an illustrative embodiment that performs both bright field analysis and dark field analysis on the diffraction spots.
Figure 4D:
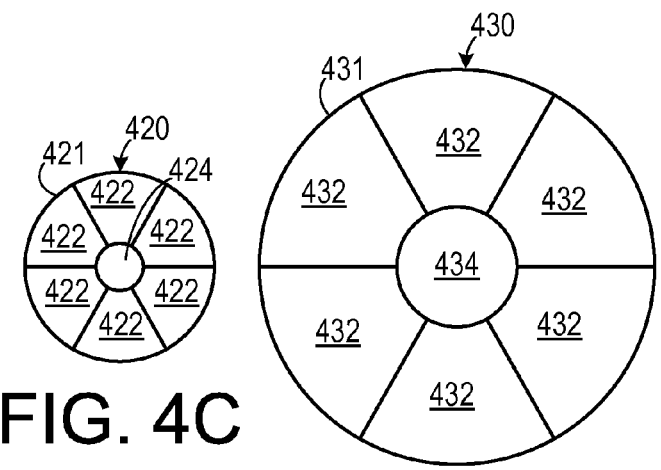
FIG. 4D is a plan view of an annular disk used to measure properties of a diffracted beam pattern.
Figure 4C:
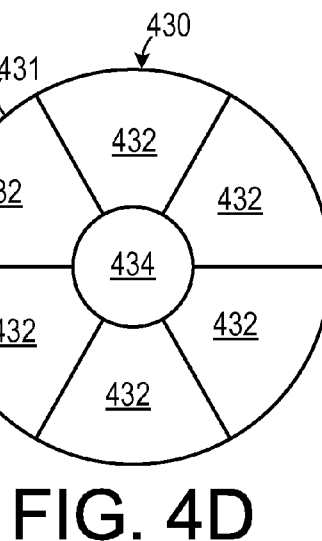
FIG. 4C is a plan view of an annular disk used to measure properties of the reflected beam.
Figure 4E:
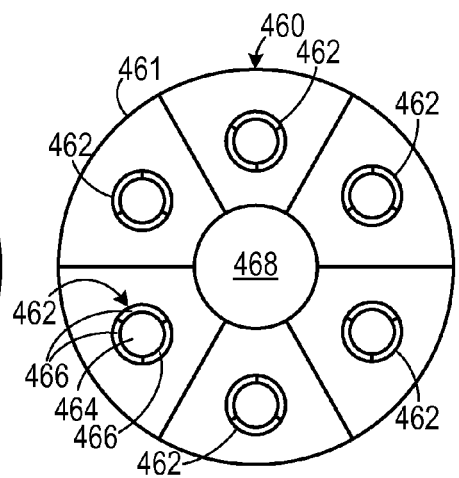
FIG. 4E is a plan view of an annular disk used to measure properties of fringe portions of a diffracted beam pattern.

The embodiment shown in FIG. 4A can be modified according to FIG. 4B by adding a dark field photon detector 460 between the diffraction grating 440 and the diffracted beam photon detector 430. In this configuration, the diffracted beam photon detector 430 acts as a bright field photon detector that detects the central portion of the diffracted beams 452, whereas the dark field photon detector 460 detects a fringe portion of each of the diffracted beams 452. The dark field photon detector 460 (shown in detail in FIG. 4E) includes an annular disk 461, defining a hole 468 for allowing the reflected beam 450 to pass therethrough, and a plurality of spaced-apart fringe photon detectors 462. The fringe photon detectors 462 may include spaced-apart photon detector segments 466, which detect the relative intensity of different portions of the fringe portion of the diffracted beams, spaced around a hole 464. The hole 464 is sized to allow the central portion of the diffracted beam to pass therethrough.

High resolution probe microscopy is not only limited by the sharpness of the probe tip but also by the data acquisition and processing techniques. The displacement and force can be measured through relative changes in location of individual diffractions spots. To isolate the amplitude and phase components of the deflection and force data, it is necessary to isolate discrete regions of individual diffraction spots. For example, the central portion and fringes of a diffraction spot are directly related to the amplitude and phase components of the data, respectfully.

Figure 5:
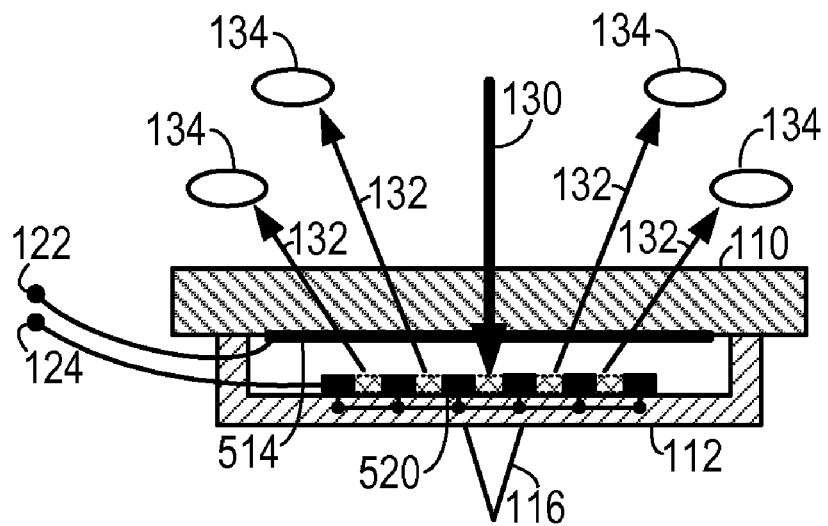
FIG. 5 is a cross sectional view of an embodiment in which the diffraction grating is disposed against a membrane in a FIRAT probe.

In one embodiment, as shown in FIG. 5, the diffraction grating 520 could be coincidental with reflective surface 114. In this embodiment, an electrode 514 could be added for the purpose of biasing and deflecting the membrane 112.

Figure 6:
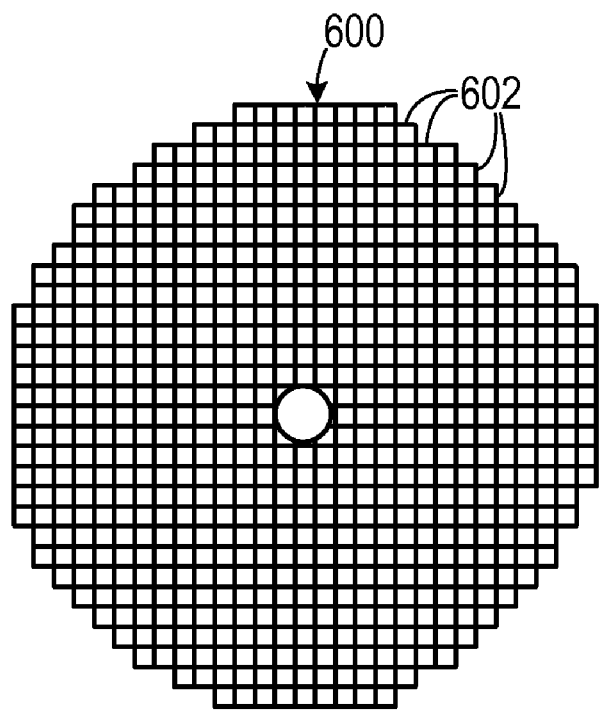
FIG. 6 is a plan view of a charge coupled device array photon detector.

The photon detectors could include any of the many different types of photon detectors known in the art. For example, complementary metal oxide semiconductor (CMOS) photon detectors could be used. As shown in FIG. 6, an array 600 of charge coupled devices (CCDs) 602 could provide highly precise analysis of both the reflected and diffracted beams.

By diffracting the beam and looking at the zero-order Laue zone, first-order Laue zone, second-order Laue zone, higher order Laue zones and any combination thereof, it is possible to extract more accurately the position, shape and forces detected by the probe in the vertical and lateral directions. The devices disclosed herein can be expanded not only to measure vertical displacements and forces acting on the probe tip, but also measure non-uniformity within the membrane and relate such deformation to lateral displacements and forces on the probe tip. In addition, the quality of the membrane can be fully characterized during operation, thereby improving precision of measurements. If the incident beam is analyzed, the resultant image is acquired using bright-field analysis, and if any individual or combinations of diffracted spots are analyzed, the resultant image is acquired using dark-field analysis. In order to measure vertical and lateral displacement forces of a cantilever, membrane or any other force-sensing structure, it is useful to gather discrete information from both the reflected beam and the diffracted beams simultaneously.

While the embodiments above discuss a light beam to detect displacement, it is understood that electromagnetic beams of many frequencies (including many non-visible frequencies) could be employed with the invention. It is intended that electromagnetic beams of all such frequencies fall within the scope of the claims. Also, while cantilever and membrane embodiments are disclosed herein, it is understood that many other displacement or force sensing structures may be used with the invention.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A displacement sensor, comprising:
   a. a light source that generates a beam of light;
   b. a displacement structure having a first surface, a probe depending outwardly therefrom, and an oppositely-disposed reflection surface that is changed when the probe interacts with the object, the reflection surface disposed so as to interact with the beam of light and so that a reflected beam reflects from the reflection surface, a characteristic of the reflected beam indicative of a state of the probe;
   c. a two-dimensional diffraction grating disposed between the light source and the reflection surface so that at least one diffracted beam is created by the diffraction grating;
   d. a first annular photon detector disposed between the light source and the diffraction grating, the first annular photon detector defining a first hole passing therethrough, the first hole having a diameter corresponding to a diameter of a light beam directed to the reflection surface, the first annular photon detector including a plurality of spaced-apart first photosensitive segments, each of the first photosensitive segments being responsive to a quality of the reflected beam; and
   e. a second annular photon detector disposed between the first annular photon detector and the diffraction grating, the second annular photon detector defining a second hole passing therethrough, the second hole having a diameter sufficient to allow the reflected beam to pass therethrough, the second annular photon detector including a plurality of spaced-apart second photosensitive segments, each of the second photosensitive segments being responsive to a quality of the diffracted beam.

2. The displacement sensor of claim 1, wherein the first annular photon detector comprises a charge coupled device.

3. The displacement sensor of claim 1, wherein the plurality of photon detectors comprises a plurality of complementary metal oxide image sensors.

4. The displacement sensor of claim 1, wherein the second annular photon detector comprises a charge coupled device.

5. The displacement sensor of claim 1, wherein the second annular photon detector comprises a complementary metal oxide image sensor.

6. The displacement sensor of claim 1, further comprising a third annular photon detector disposed between the second annular photon detector and the diffraction grating, the third annular photon detector comprising a plurality of spaced-apart third photosensitive segments, each of the third photosensitive segments defining a hole passing therethrough that has a diameter that is wide enough to allow a central portion of the diffracted beam to pass therethrough, but that is narrow enough to cause a fringe portion of the diffracted beam to illuminate a portion of the third photosensitive segment.

7. The displacement sensor of claim 6, wherein the third annular photon detector comprises a charge coupled device.

8. The displacement sensor of claim 6, wherein the third annular photon detector comprises a complementary metal oxide image sensor.

9. The displacement sensor of claim 1, wherein the displacement probe is mounted on a cantilever.

10. The displacement sensor of claim 1, wherein the displacement probe is mounted on a membrane.

* * * * *